US012244568B2

(12) United States Patent
Goel et al.

(10) Patent No.: US 12,244,568 B2
(45) Date of Patent: Mar. 4, 2025

(54) METHOD(S) AND SYSTEM(S) FOR UTILIZING AN INDEPENDENT SERVER TO FACILITATE SECURE EXCHANGE OF DATA

(71) Applicant: GOOGLE LLC, Mountain View, CA (US)

(72) Inventors: Akshay Goel, Seattle, WA (US); Jonathan Eccles, San Francisco, CA (US); Nitin Khandelwal, Sunnyvale, CA (US); Sarvjeet Singh, Palo Alto, CA (US); David Sanchez, Burlingame, CA (US); Ashwin Ram, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 267 days.

(21) Appl. No.: 17/893,728

(22) Filed: Aug. 23, 2022

(65) Prior Publication Data

US 2024/0031339 A1    Jan. 25, 2024

Related U.S. Application Data

(60) Provisional application No. 63/390,839, filed on Jul. 20, 2022.

(51) Int. Cl.
*H04L 9/40* (2022.01)
(52) U.S. Cl.
CPC .......... *H04L 63/04* (2013.01); *H04L 63/0853* (2013.01)
(58) Field of Classification Search
None
See application file for complete search history.

(56) References Cited

U.S. PATENT DOCUMENTS 9,253,015 B2 *   2/2016   Girard ................... H04L 67/101
9,389,826 B2 *   7/2016   Husain ................. H04L 65/1069
(Continued)

FOREIGN PATENT DOCUMENTS

WO    2016094807 A1    6/2016

OTHER PUBLICATIONS

European Patent Office; International Search Report and Written Opinion issued in Application No. PCT/US2022/080059; 12 pages; dated Mar. 28, 2023.

*Primary Examiner* — Kaveh Abrishamkar
(74) *Attorney, Agent, or Firm* — Gray Ice Higdon

(57) ABSTRACT

Implementations described herein utilize an independent server for facilitating secure exchange of data between multiple disparate parties. The independent server receives client data, via an automated assistant application executing at least in part at a client device, that is to be transmitted to a given third-party application. The independent server processes the client data, using a first encoder-decoder model, to generate opaque client data, and transmits the opaque client data to the given third-party application and without transmitting any of the client data. Further, the independent server receives response data, via the given third-party application, that is generated based on the opaque client data and that is to be transmitted back to the client device. The independent server processes the response data, using a second encoder-decoder model, to generate opaque response data, and transmits the opaque response data to the client device and without transmitting any of the response data.

20 Claims, 6 Drawing Sheets

(56) References Cited

U.S. PATENT DOCUMENTS

| | | | |
|---|---|---|---|
| 2003/0149880 A1 | 8/2003 | Shamsaasef | |
| 2012/0317182 A1* | 12/2012 | Husain | H04L 41/28 |
| | | | 709/203 |
| 2018/0332169 A1* | 11/2018 | Somech | H04L 67/55 |
| 2019/0237095 A1* | 8/2019 | Duguid | G10L 25/54 |
| 2020/0104705 A1* | 4/2020 | Bhowmick | G06N 3/044 |
| 2022/0067500 A1* | 3/2022 | Choque | G06N 3/08 |
| 2023/0074261 A1* | 3/2023 | Palamadai | H04L 65/4015 |

\* cited by examiner

METHOD(S) AND SYSTEM(S) FOR UTILIZING AN INDEPENDENT SERVER TO FACILITATE SECURE EXCHANGE OF DATA

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances and/or other user inputs (e.g., typed input, touch input, etc.). For example, an automatic speech recognition (ASR) engine can process audio data that correspond to a spoken utterance of a user to generate ASR output, such as speech hypotheses (i.e., sequence of term(s) and/or other token(s)) of the spoken utterance. Further, a natural language understanding (NLU) engine can process the ASR output (or touch/typed input) to generate NLU output, such as one or more predicted intents expressed by the user in providing the spoken utterance (and/or other user inputs) and optionally slot value(s) for parameter(s) associated with each of the one or more predicted intents. Moreover, a fulfillment engine can be used to process the NLU output to obtain fulfillment output, such as content to be provided for presentation to the user responsive to the spoken utterance and/or an action to be performed by the automated assistant or another computing device responsive to the spoken utterance.

In many instances, an automated assistant may interact with various third parties in fulfilling requests of a user and/or in proactively providing content for presentation to a user. For example, assume a user provides a spoken utterance of "Assistant, play Crazy using Example Music Streaming Platform". In this example, the automated assistant can generate NLU output that includes at least a predicted music playback intent having a slot value of "Crazy" for a song parameter to be played using "Example Music Streaming Platform". Although the user did not specify any slot value for an artist parameter, the automated assistant may infer various artist slot values for the artist parameter based on client device data to determine multiple interpretations of the spoken utterance. Further, the automated assistant may transmit one or more of the multiple interpretations to "Example Music Streaming Platform". However, in transmitting one or more of the multiple interpretations of the spoken utterance to "Example Music Streaming Platform", client device data of the user may be susceptible to being compromised by "Example Music Streaming Platform" and/or nefarious actors since some client device data (e.g., the ASR output, the NLU output, user preferences, user history, etc.) that is utilized in determining one or more of the multiple interpretations of the spoken utterance that are transmitted over network(s) may be inferred back by "Example Music Streaming Platform" and/or nefarious actors even in scenarios when the underlying client device data itself is not transmitted over the network(s).

Continuing with the above example, assume the automated assistant wants to proactively provide a song recommendation for presentation to the user after "Crazy" is provided for audible playback to the user. In this example, the automated assistant may determine cohort data for a given cohort of users, of a plurality of disparate cohorts of users, to which the user belongs based on each of the users of the given cohort having the same or similar music preferences. Further, the automated assistant may transmit the cohort data to "Example Music Streaming Platform" to obtain one or more song recommendations for the user based on the cohort data. However, in transmitting the cohort data for the given cohort to which the user belongs to "Example Music Streaming Platform", not only may the client device data of the user be susceptible to being compromised by "Example Music Streaming Platform" and/or nefarious actors, but corresponding client device data of other users may also be susceptible to being compromised by virtue of those other users also belong to the given cohort of users.

However, absent sharing of this client device data, the request may be fulfilled sub-optimally (e.g., playing a song entitled "Crazy" by an artist with which the user did not intend) and/or the content that is proactively provided for presentation to the user may be sub-optimal (e.g., a song recommendation from a genre of music that the user dislikes). As a result, the user may resubmit various spoken utterances to the automated assistant (and optionally including more specific slot values) and/or manually interact with "Example Streaming Platform", thereby increasing a quantity of user inputs received at the client device and unnecessarily wasting computational and/or network resources. Further, the user may become frustrated not only with the automated assistant, but also with "Example Streaming Platform", thereby negatively impacting the user experience of the user. Accordingly, there is a need in the art for techniques to facilitate secure exchange of this data.

SUMMARY

Implementations described herein are directed to utilizing an independent server to facilitate secure exchange of data between multiple disparate parties. For example, the independent server may facilitate secure exchange of data between an automated assistant executing at least in part a given client device of a given user and a given third-party application. The independent server may receive client device data, via the automated assistant, that is to be transmitted to the given third-party application. Further, the independent server may process the client device data, using a trained encoder-decoder model, to generate opaque client device data that is an opaque version of the client device data, and may transmit the opaque client device data to the given third-party application and without transmitting any of the underlying client device data. The transmitting of the opaque client device data to the given third-party application may cause the given third-party application to process the opaque client device data to generate third-party response data, and transmit the third-party response data back to the independent server. The independent server may receive the third-party response data, via the given third-party application, that is generated based on the opaque client data and that is to be transmitted back to the client device. Moreover, the independent server may process the third-party response data, using the trained encoder-decoder model and/or an additional trained encoder-decoder model, to generate opaque third-party response data that is an opaque version of the third-party response data, and may transmit the opaque third-party response data back to the given client device and without transmitting any of the underlying third-party response data. This enables the given client device and/or the automated assistant implemented at least in part thereon to generate content, and cause the content to be provided for presentation to the user.

Although the above example is described with respect to the independent server facilitating secure exchange of data between the automated assistant and the given third-party application, it should be understood that is for the sake of example and is not meant to be limiting. As another example, the independent server may additionally or alternatively be utilized to facilitate secure exchange of data between multiple disparate third-party applications, such that secure exchange of data via the independent server may be provided as a service.

In various implementations, the encoder-decoder model and/or the additional encoder-decoder model for facilitating secure exchange of data between the automated assistant and the given third-party application may be trained during a joint session at the independent server. In training the encoder-decoder model and/or the additional encoder-decoder model, the independent server may obtain a corresponding set of tokens that corresponds to a vocabulary, corresponding sets of client device data, and corresponding sets of third-party response data. The corresponding set of tokens that correspond to the vocabulary may include tokens corresponding to words, phrases, symbols, numbers, and/or any other representation that is capable of encoding underlying meaning of data. The corresponding set of tokens may be commonly agreed upon by at least the automated assistant and the given third-party application to facilitate secure transfer of data therebetween and in a bi-directional manner. Each of the corresponding sets of client device data may include given user request data, given user cohort data, given user profile data, and/or other given client device data that may be transmitted to the given third-party application. Each of the corresponding sets of third-party response data may include given third-party data, given third-party user cohort data, given third-party user profile data, and/or other given third-party data that may be transmitted back to the given client device and/or the automated assistant.

In some versions of those implementations, a plurality of automated assistant application training instances may be generated based on the corresponding set of tokens and the corresponding sets of client device data. The plurality of automated assistant application training instances may be subsequently utilized to train the encoder-decoder model to generate opaque versions of client device data. For instance, a given automated assistant application training instance may include training instance input and training instance output. The training instance input may include a given corresponding set of client device data, from among the corresponding sets of client device data, and the training instance output may include one or more tokens, from among the corresponding set of tokens. Accordingly, in training the encoder-decoder model based on the given automated assistant application training instance, the encoder-decoder model learns to generate an opaque version of the given corresponding set of client device data that is represented by the one or more tokens.

In some further versions of those implementations, a plurality of given third-party application training instances may be generated based on the corresponding set of tokens and the corresponding sets of client device data. The plurality of given third-party application training instances may be subsequently utilized to train the encoder-decoder model and/or the additional encoder-decoder model to generate opaque versions of third-party device data. For instance, a given third-party application training instance may include training instance input and training instance output. The training instance input may include a given corresponding set of third-party data, from among the corresponding sets of third-party response data, and the training instance output may include one or more additional tokens, from among the corresponding set of tokens, and that include at least one unique token with respect to the one or more tokens of the training instance output of the given automated assistant application training instance. Accordingly, in training the encoder-decoder model and/or the additional encoder-decoder model based on the given third-party application training instance, the encoder-decoder model and/or the additional encoder-decoder model learns to generate an opaque version of the given third-party application data that is represented by the one or more additional tokens. Notably, the given third-party application training instance may include corresponding third-party response data that was previously generated responsive to the corresponding set of client device data utilized in generating the given automated assistant application training instance. Accordingly, the automated assistant application training instance and the given third-party application training instance may be considered a training instance pair. Further, since these training instances utilize the corresponding set of tokens that are commonly agreed upon by both the automated assistant and the given third-party application, corresponding machine learning models implemented by these disparate parties may be able handle the opaque versions of data generated by these encoder-decoder models.

In various implementations, and subsequent to the joint training sessions, the independent server may utilize the encoder-decoder model and/or the additional encoder-decoder models in facilitating secure exchange of data between multiple disparate parties that participated in the joint training session. Notably, the encoder-decoder model and/or the additional encoder-decoder models may be utilized in response to explicit user requests for data from the given third-party application (e.g., "Assistant, play a song using Example Music Streaming Platform", where "Example Streaming Platform" corresponds to the given third-party application) and/or implicit user request (e.g., when the automated assistant identifies a need for a suggestion or recommendation to be provided for presentation to the given user of the given client device). Accordingly, the independent server may utilize the encoder-decoder model and/or the additional encoder-decoder models for purposes of ranking, natural language understanding (NLU), propensity analysis, recommendations, suggestions, and/or any other scenario that requires transfer of data between multiple disparate parties.

In some versions of those implementations, the independent server may only be utilized in response to determining that the data to be transmitted between the multiple disparate parties is privacy-sensitive data, such as data that includes data that is personal to the given user of the given client device. Otherwise, the data may be considered non-privacy-sensitive data, and the data may be transmitted directly from one of the multiple disparate parties to another one of the multiple disparate parties. Accordingly, the independent server may only be selectively utilized to facilitate secure transfer of data in scenarios where the data being transferred is considered privacy sensitive data.

By using the techniques described herein, one or more technical advantages can be achieved. As one non-limiting example, the techniques described herein enable secure transfer of data between multiple disparate parties, such as between an automated assistant and a given third-party application, between a given third-party application or an additional given third-party application. For example, rather than sharing the data directly between these multiple disparate parties, an independent server may be utilized to generate opaque versions of the data prior to being transferred from one of these multiple disparate parties to another. Accordingly, the direct sharing of the data between these multiple disparate parties can be reduced or obviated, thereby resulting in increased security of users' data. Further, content generated based on the opaque versions of the data provide the same or similar precision and/or recall due to various machine learning models of these multiple disparate parties due to capable of handling the opaque versions of the data since a commonly agreed upon set of tokens is utilized in generating the opaque versions of the data during joint training sessions as described herein. Accordingly, not only is security of users' data increased, but the user experience may also be improved.

In some implementations, the term "first-party (1P) application" may refer to a computational agent, system, or software application that is developed and/or maintained by the same entity that develops and/or maintains the automated assistant described herein. In some implementations, the term "third-party (3P) application" may refer to a computational agent, system, or software application that is developed and/or maintained by an entity that is different from the entity that develops and/or maintains the automated assistant described herein. In additional or alternative implementations, the term "third-party (3P) application" refers to any computational agent, system, or software application that is developed and/or maintained by the same entity that develops and/or maintains the automated assistant described herein, but that is computationally distinct from the automated assistant (e.g., hosted at one or more servers that are physically distinct from the client device and/or any servers that host the automated assistant). In some implementations, the term "independent server" may refer to a computational agent or system that is developed and/or maintained to implement a secure data exchange system. The independent server may be developed and/or maintained by an entity that is the same entity that develops and/or maintains the automated assistant described herein, or that is different from the entity that develops and/or maintains the automated assistant described herein.

Each of the software applications described herein (e.g., the automated assistant application, the 1P application(s), the 3P application(s), and/or any other software application described herein) may be implemented by a computing device or system that includes at least memory, processor(s) to execute instructions stored in the memory, and one or more of network interface(s) to receive and/or transmit data over wired or wireless local area network(s) ("LANs," including Wi-Fi LANs, mesh networks, Bluetooth, near-field communication, etc.) and/or wide area network(s) ("WANs", including the Internet) and/or application programming interface(s). Further, each of the software applications described herein can be implemented locally at a client device, remotely from a client device (e.g., at remote server(s)), or both (e.g., in a distributed manner).

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

DETAILED DESCRIPTION

Figure 1:
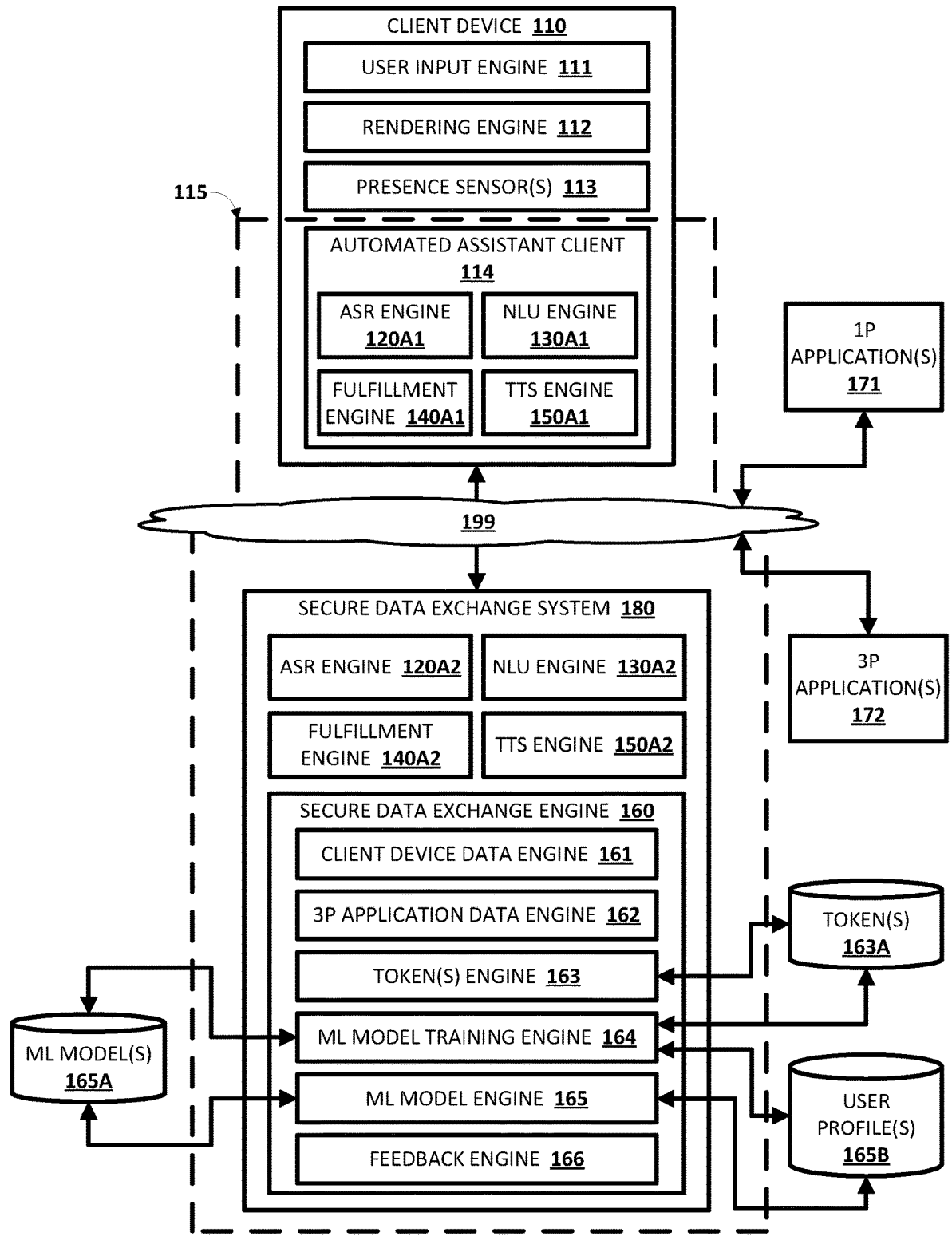
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a secure data exchange system 180. In some implementations, the secure data exchange system 180 can be implemented locally at the client device 110. In additional or alternative implementations, the secure data exchange system 180 can be implemented remotely from the client device 110 as depicted in FIG. 1. In these implementations, the client device 110 and the secure data exchange system 180 may be communicatively coupled with each other via one or more networks 199, such as one or more wired or wireless local area networks ("LANs," including Wi-Fi LANs, mesh networks, BLUETOOTH, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the secure data exchange system 180 implemented locally at the client device 110 and/or remotely via one or more of the networks 199 as depicted in FIG. 1. The automated assistant client 114 (and optionally by way of its interactions with other remote system (e.g., server(s))) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the secure data exchange system 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or one or more remote servers that may implement the secure data exchange system 180.

In various implementations, the client device 110 may include a user input engine 111 that is configured to detect user input provided by a user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110. Additionally, or alternatively, the client device 110 may be equipped with one or more haptic sensors that enables content to be provided for presentation to the user via one or more of the haptic sensors of the client device 110.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering responsive content (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. In various implementations, the automated assistant 115 can leverage data determined based on the presence sensors 113 in determining the client device 110 (or other computing device(s)) to be utilized in satisfying the spoken utterance based on where a user is near or was recently near, and provide corresponding commands to only the client device 110 (or those other computing device(s)).

In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally obtain recommendations and/or suggestions to be proactively provided at the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice based on audio data captured via microphone(s) of the client device 110 and/or may perform face identification (FID) to recognize a user from capturing his/her face based on vision data captured via vision component(s) of the client device 110. In some implementations, movement of the speaker may then be determined, e.g., by the presence sensors 113 of the client device 110 (and optionally GPS sensors, *Soli* chips, and/or accelerometers of the client device 110). In some implementations, based on such detected movement, a location of the user may be predicted, and this location may be assumed to be the user's location when any content to be rendered at the client device 110 and/or other computing device(s) based at least in part on proximity of the client device 110 and/or other computing device(s) to the user's location. In some implementations, the user may simply be assumed to be in the last location at which he/she engaged with the automated assistant 115, especially if not much time has passed since the last engagement.

Further, the client device 110 and/or the secure data exchange system 180 may include one or more memories for storage of data and/or software applications, one or more processors for accessing data and executing software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199. The operations performed by the client device 110, other computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., the network(s) 199 of FIG. 1).

In some implementations, the operations performed by the automated assistant 115 may be implemented locally at the client device 110 via the automated assistant client 114. As shown in FIG. 1, the automated assistant client 114 may include an automatic speech recognition (ASR) engine 120A1, a natural language understanding (NLU) engine 130A1, a fulfillment engine 140A1, and a text-to-speech (TTS) engine 150A1. In some implementations, the operations performed by the automated assistant 115 may be distributed across multiple computer systems, such as when the secure data exchange system 180 is implemented remotely from the client device 110 as depicted in FIG. 1. In these implementations, the automated assistant 115 may additionally or alternatively utilize ASR engine 120A2, NLU engine 130A2, fulfillment engine 140A2, and TTS engine 150A2 of the secure data exchange system 180.

Each of these engines may be configured to perform one or more functions. For example, the ASR engine 120A1 and/or 120A2 can process, using ASR model(s) (e.g., a recurrent neural network (RNN) model, a transformer model, an RRN-transducer (RNN-T) model and/or any other type of machine learning (ML) model capable of performing ASR), audio data that captures a spoken utterance and that is generated by microphone(s) of the client device 110 to generate ASR output. Further, the NLU engine 130A1 and/or 130A2 can process, using NLU model(s) (e.g., a long short-term memory (LSTM), gated recurrent unit (GRU), and/or any other type of RNN or other ML model capable of performing NLU) and/or grammar-based rule(s), the ASR output to generate NLU output. Moreover, the fulfillment engine 140A1 and/or 140A2 can generate fulfillment output(s) based on fulfillment data generated based on the stream of NLU output. The fulfillment data can be generated using, for example, the automated assistant 115, one or more first-party (1P) applications 171, and/or one or more third-party (3P) applications 172. Lastly, the TTS engine 150A1 and/or 150A2 can process, using TTS model(s), textual data (e.g., text formulated by the automated assistant 115, the 1P application(s) 171, and/or the 3P application(s) 172) to generate synthesized speech audio data that includes computer-generated synthesized speech. Notably, the ML model(s) stored in the ML model(s) database 115A can be on-device ML models that are stored locally at the client device 110 or shared ML models that are accessible to both the client device 110 and/or remote systems (e.g., server(s)).

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

In some implementations, the entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

In some implementations, the automated assistant 115, the 1P application(s) 171, and/or the 3P application(s) 172 can utilize the secure data exchange system 180 to ensure any privacy-sensitive data transmitted therebetween is transmitted in a privacy-sensitive manner. In particular, the automated assistant 115, the 1P application(s) 171, and/or the 3P application(s) 172 can utilize a secure data exchange engine 160 of the secure data exchange system 180 to ensure any privacy-sensitive data transmitted therebetween is transmitted in a privacy-sensitive manner. In various implementations, and as depicted in FIG. 1, the secure data exchange engine 160 can include a client device data engine 161, a 3P application data engine 162, a token(s) engine 163, a ML model training engine 164, a ML model engine 165, and a feedback engine 166. Additional description with respect to how the automated assistant 115, the 1P application(s) 171, and/or the 3P application(s) 172 utilize the secure data exchange engine 160 is provided with respect to FIG. 2.

Figure 2:
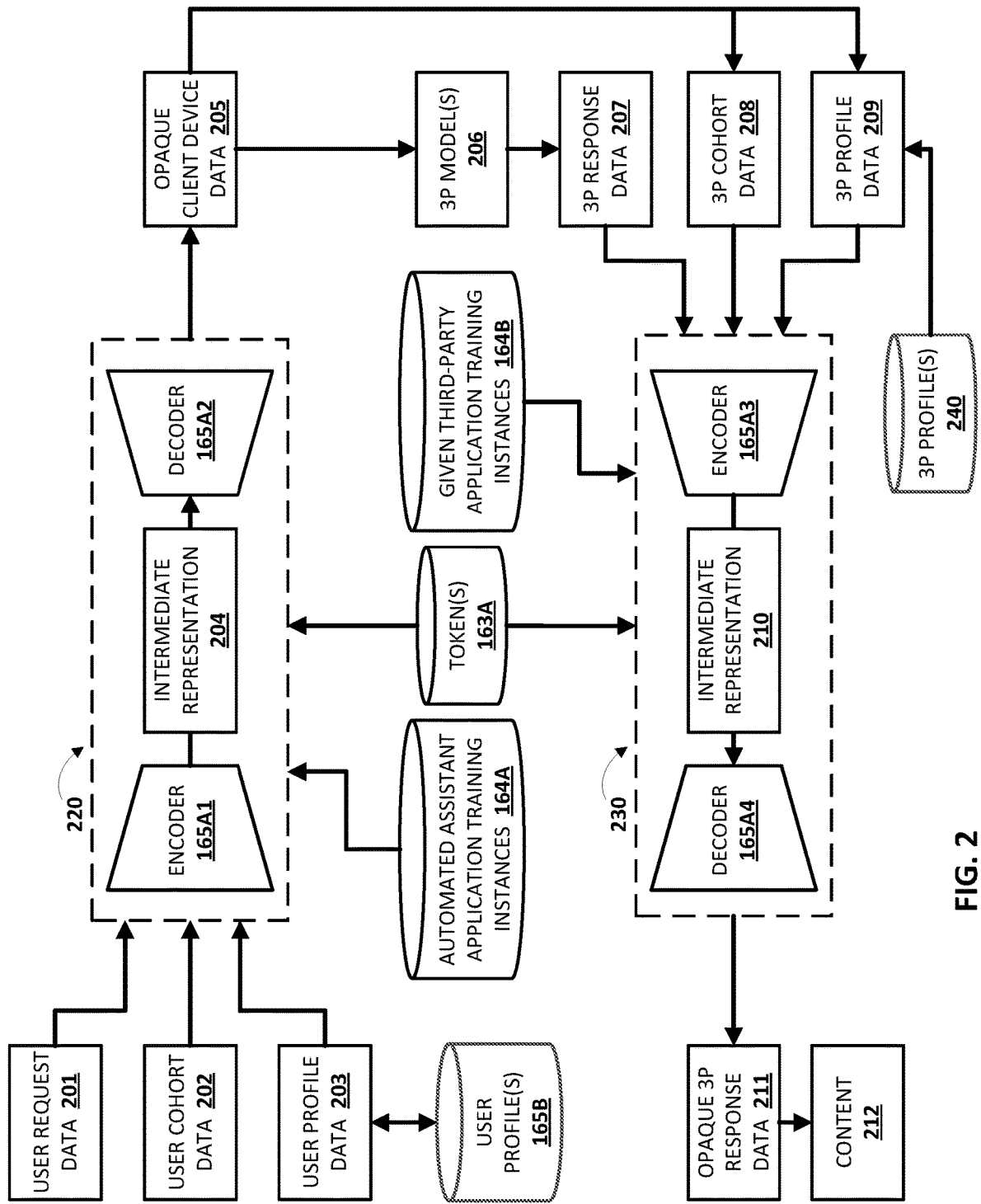
FIG. 2 depicts an example process flow that demonstrates various aspects of the present disclosure using various components of FIG. 1, in accordance with various implementations.

Turning now to FIG. 2, an example process flows that demonstrates various aspects of the present disclosure using various components of FIG. 1 is depicted. In particular, FIG. 2 is described with respect to the secure data exchange system 180 being implemented by an independent server that is remote from the client device 110, the 1P application(s) 171, and the 3P application(s) 172. In some implementations, the ML model training engine 164 may initially train various encoder-decoder models during joint training sessions between the automated assistant 115 and a given 3P application of the 3P application(s) 172.

For example, assume that the secure data exchange system 180 will be utilized to facilitate the exchange of data between the automated assistant 115 and "Example Music Streaming Platform"—a fictitious 3P application of the 3P application(s). In this example, a first encoder-decoder model 220 that is specific to the automated assistant 115 for "Example Music Streaming Platform", and a second encoder-decoder model 230 that is specific to "Example Music Streaming Platform" for the automated assistant 115 may be trained during the joint training session. Although FIG. 2 is described with respect to the first encoder-decoder model 220 and the second encoder-decoder model 230 being trained for the automated assistant and "Example Music Streaming Platform", it should be understood that is for the sake of example and is not meant to be limiting. The first encoder-decoder model 220 and the second encoder-decoder model 230 may be stored, for example, in the ML model(s) database 165A. For example, during the joining training session, other encoder-decoder models for the automated assistant, "Example Music Streaming Platform", other 1P application(s) of the 1P application(s) 171, and/or other 3P application(s) of the 3P application(s) 172 may be trained to subsequently facilitate secure exchange of data therebetween.

During the joint training session, the independent server may obtain corresponding sets of client device data, corresponding sets of 3P response data, and a corresponding set of tokens corresponding to a vocabulary. In various implementations, the corresponding sets of client device data may be obtained using the client device data engine 161, and may include, for example, user request data 201, user cohort data 202, and/or user profile data 203 obtained from one or more user profiles (e.g., stored in user profile(s) database 165B) that are accessible to the automated assistant 115. The user request data 201 may include corresponding request data that is based on one or more corresponding user inputs of a respective user that is detected at a respective one of a plurality of client devices and that causes the automated assistant 115 to interact with "Example Music Streaming Platform", corresponding suggestion data or corresponding recommendation data that is based on the automated assistant 115 identifying a corresponding need for suggested content or recommended content from "Example Music Streaming Platform" that is to be provided for presentation to a respective user of a plurality of client devices, and/or any other corresponding data generated locally at one or more of the plurality of client devices that previously caused the automated assistant 115 to interact with "Example Music Streaming Platform".

Further, the user cohort data 202 can include a given cohort, of a plurality of disparate cohorts, to which respective users of a plurality client devices are assigned by the automated assistant 115. Each of the disparate cohorts may be defined with varying degrees of granularity and users may belong to a single cohort or multiple cohorts. For instance, assume that respective users of a plurality of client devices that implement the automated assistant 115 are grouped in corresponding cohorts based on similar music interests of the respective users. In this example, each of the respective users that have demonstrated an interest in rock music may be assigned to a first cohort, each of the respective users that have demonstrated an interest in country music may be assigned to a second cohort, and so on for other genres of music. In some of these examples, each of the respective users that have demonstrated an interest in both rock music and country music may be assigned to both the first cohort and the second cohort. In other examples, each of the respective users that have demonstrated an interest in both rock music and country music may be assigned to a different third cohort rather than both the first cohort and the second cohort. Put another way, the user cohort data 202 may be data that represents a cluster of users based on shared common interests.

Moreover, the user profile data 203 can include, for example, corresponding user preferences for respective users of a plurality of client devices, corresponding query activity or respective users of a plurality of client devices, and/or any other data that is derivable from the one or more user profiles (e.g., stored in user profile(s) database 165B) that are accessible to the automated assistant 115. Notably, the user profile data 203 may have been previously utilized by the automated assistant in assigning a plurality of users to corresponding cohorts. However, the user profile data 203 may include data that is not readily ascertainable from the user cohort data 202.

In various implementations, the corresponding sets of 3P response data may be obtained using the 3P application data engine 162, and may include, for example, response data 207, 3P cohort data 208, and/or 3P profile data 209 obtained from one or more user profiles (e.g., stored in 3P profile(s) database 240) that are accessible to "Example Music Streaming Platform". Notably, the corresponding sets of 3P response data obtained by the independent server may include 3P response data for each of the corresponding sets of client device data. Put another way, the corresponding sets of client device data may include data that could be provided by the automated assistant and to "Example Music Streaming Platform" in furtherance of fulfilling a corresponding request from a plurality of client devices, and the corresponding sets of 3P response data may include data that could be generated by "Example Music Streaming Platform" in furtherance of fulfilling the corresponding request from the plurality of client devices.

For instance, assume that a given user of a given client device previously provided a spoken utterance of "Assistant, play some music using Example Music Streaming Platform". In this example, a given corresponding set of client device data may include given user request data that includes at least an intent of "play music", given user cohort data that indicates the automated assistant 115 has assigned the given user to a third cohort, of 200 disparate automated assistant cohorts, associated with users that like hard rock music, and given user profile data for the given user that indicates the user's favorite hard rock artist is "Example Rock Artist". Further, in this example, and based on at least some of the given corresponding set of client device data (e.g., based on at least the given user request data that includes at least the intent of "play music"), a given corresponding set of 3P response data may include given 3P response data that is indicative of one or more songs or a ranking thereof, given 3P cohort data that indicates "Example Music Streaming Platform" has assigned the given user to a first cohort, of 50 disparate "Example Music Streaming Platform" cohorts, associated with users that like general rock music, and given 3P profile data for the given user that indicates the user's favorite type of rock music is hard rock (e.g., rather than punk rock and/or other genres of rock music). Accordingly, for each of the corresponding sets of client device data, there may be a given corresponding set of 3P response data.

Notably, in obtaining the corresponding sets of client device data and the corresponding sets of 3P response data, the independent server may utilize various techniques to preserve privacy and security of this data. For instance, the independent server may utilize a differential privacy technique to ensure client device data is not compromised in obtaining data for these joint training sessions. Additionally, or alternatively, the independent server may utilize a federated learning technique to ensure the client device data is not compromised in obtaining data for these joint training sessions. Accordingly, not only does the secure data exchange system 180 ensure privacy and security of client device data at inference, but also during joint training sessions.

In various implementations, the corresponding set of tokens corresponding to the vocabulary may be obtained using the token(s) engine 163 and from token(s) database 163A. The corresponding set of tokens corresponding to the vocabulary may be a set of commonly agreed upon tokens between the automated assistant 115 and "Example Music Streaming Platform" that enables secure exchange of data between the automated assistant 115 and "Example Music Streaming Platform" in a bi-directional manner and subsequent to training the first encoder-decoder model 220 and the second encoder-decoder model 230 via the secure data exchange system 180. The set of tokens that correspond to the vocabulary may include tokens corresponding to words, phrases, symbols, numbers, and/or any other representation that is capable of encoding underlying meaning of data. At inference, the corresponding set of tokens may be utilized in generating opaque versions of client device data and 3P response data for the secure exchange thereof via the secure data exchange system 180. Further, since the corresponding set of tokens is commonly agreed upon by the automated assistant 115 and "Example Music Streaming Platform", various ML models employed by the automated assistant 115 and "Example Music Streaming Platform" (e.g., ranking ML model(s), suggestion ML model(s), recommendation ML model(s), sentiment ML model(s), propensity ML model(s), NLU model(s), and/or other ML model(s)) are capable of handling the opaque versions of client device data and the 3P response data as input in addition to signals generated by the respective parties (e.g., the respective request/response data, the respective cohort data, the respective user profile data, and so on). However, each token included in the corresponding set of tokens may not be semantically interpretable by a human reviewer upon inspection of the tokens, and, as a result, the opaque versions of the client device data and 3P response data are usable by the various ML models employed by the automated assistant 115 and "Example Music Streaming Platform", but in a manner that maintains security of the underlying data.

In various implementations, the ML model training engine 164 may generate a plurality of training instances based on the corresponding sets of client device data, the corresponding sets of 3P response data, and the corresponding set of tokens. For example, the ML model training engine may generate a given automated assistant application training instance based on a given corresponding set of client device data and the corresponding set of tokens, and cause the given automated assistant training instance to be stored in automated assistant application training instances database 164A for subsequent utilization in training the first encoder-decoder model 220. The given automated assistant application training instance may include training instance input corresponding to the given corresponding set of client device data, and training instance output corresponding to one or more tokens from the corresponding set of tokens. By training the first encoder-decoder model 220 based on the given automated assistant application training instance (and other automated assistant application training instances) the first encoder-decoder model 220 is trained to generate an opaque version of the given corresponding set of client device data included in the training instance input (and opaque versions of the corresponding sets of client device data included in corresponding training instance input of the other automated assistant application training instances).

For instance, the ML model training engine 164 may apply the given corresponding set of client device data (e.g., the training instance input of the given automated assistant application training instance described above) as input across an encoder portion 165A1 of the first encoder-decoder model 220 to generate an intermediate representation 204 thereof, such as a context vector or the like. Further, the ML model training engine 164 may apply the intermediate representation 204 as input across a decoder portion 165A2 of the first encoder-decoder model 220 to generate predicted output. Moreover, the ML model training engine 164 may compare the predicted output to the one or more tokens from the corresponding set of tokens (e.g., the training instance output of the given automated assistant application training instance described above) to generate one or more losses. Moreover, the ML model training engine 164 may update the first encoder-decoder model 220 based on the one or more losses (e.g., via backpropagation). The ML model training engine 164 may continue training the first encoder-decoder model 220 in this manner and based on a plurality of additional automated assistant application training instances stored in the automated assistant application training instances database 164A until one or more training conditions are satisfied. The one or more training conditions can include, for example, the first encoder-decoder model 220 being trained based on a threshold quantity of automated assistant application training instances, the first encoder-decoder model 220 being trained for a threshold duration of time, the first encoder-decoder model 220 satisfying one or more performance criteria (e.g., in terms of recall and/or precision), and/or other training criteria.

In various implementations, the ML model training engine 164 may generate a plurality of training instances based on the corresponding sets of 3P response data, the corresponding sets of 3P response data, and the corresponding set of tokens. For example, the ML model training engine 164 may generate a given automated assistant application training instance based on a given corresponding set of client device data and the corresponding set of tokens, and cause the given automated assistant training instance to be stored in automated assistant application training instances database 164A for subsequent utilization in training the first encoder-decoder model 220. The given automated assistant application training instance may include training instance input corresponding to the given corresponding set of client device data, and training instance output corresponding to one or more tokens from the corresponding set of tokens. By training the first encoder-decoder model 220 based on the given automated assistant application training instance (and other automated assistant application training instances), the first encoder-decoder model 220 is trained to generate an opaque version of the given corresponding set of client device data included in the training instance input (and opaque versions of the corresponding sets of client device data included in corresponding training instance input of the other automated assistant application training instances).

For instance, the ML model training engine 164 may apply the given corresponding set of client device data (e.g., the training instance input of the given automated assistant application training instance described above) as input across an encoder portion 165A1 of the first encoder-decoder model 220 to generate an intermediate representation 204 thereof, such as a context vector or the like. Further, the ML model training engine 164 may apply the intermediate representation 204 as input across a decoder portion 165A2 of the first encoder-decoder model 220 to generate predicted output. Moreover, the ML model training engine 164 may compare the predicted output to the one or more tokens from the corresponding set of tokens (e.g., the training instance output of the given automated assistant application training instance described above) to generate one or more losses. Moreover, the ML model training engine 164 may update the first encoder-decoder model 220 based on the one or more losses (e.g., via backpropagation). The ML model training engine 164 may continue training the first encoder-decoder model 220 in this manner and based on a plurality of additional automated assistant application training instances stored in the automated assistant application training instances database 164A until one or more training conditions are satisfied. The one or more training conditions can include, for example, the first encoder-decoder model 220 being trained based on a threshold quantity of automated assistant application training instances, the first encoder-decoder model 220 being trained for a threshold duration of time, the first encoder-decoder model 220 satisfying one or more performance criteria (e.g., in terms of recall and/or precision), and/or other training criteria.

Also, for example, the ML model training engine 164 may generate a given 3P application training instance based on a given corresponding set of 3P response data and the corresponding set of tokens, and cause the given 3P application training instance to be stored in given 3P application training instances database 164B for subsequent utilization in training the second encoder-decoder model 230. Notably, the given corresponding set of 3P response data utilized in generating the given 3P application training instance in this example may correspond to 3P response data for the given corresponding set of client device data utilized in generating the given automated assistant application training instance in the above example. The given 3P application training instance may include training instance input corresponding to the given corresponding set of 3P response data, and training instance output corresponding to one or more additional tokens from the corresponding set of tokens. Accordingly, the given automated assistant application training instance in the above example and the given 3P application training instance in this example may be considered a pair of training instances that enables the ML model training engine 164 to ensure the first encoder-decoder model 220 and the second encoder-decoder model 230 are trained to learn the relationships between the data and the opaque versions of the data during the joint training session. By training the second encoder-decoder model 230 based on the given 3P application training instance (and other 3P application training instances), the second encoder-decoder model 230 is trained to generate an opaque version of the given corresponding set of 3P response data included in the training instance input (and opaque versions of the corresponding sets of 3P response data included in corresponding training instance input of the other 3P application training instances).

For instance, the ML model training engine 164 may apply the given corresponding set of 3P response data (e.g., the training instance input of the given 3P application training instance described above) as input across an encoder portion 165A3 of the second encoder-decoder model 230 to generate an intermediate representation 210 thereof, such as a context vector or the like. Further, the ML model training engine 164 may apply the intermediate representation 210 as input across a decoder portion 165A4 of the second encoder-decoder model 230 to generate predicted output. Moreover, the ML model training engine 164 may compare the predicted output to the one or more additional tokens from the corresponding set of tokens (e.g., the training instance output of the given 3P application training instance described above) to generate one or more losses. Moreover, the ML model training engine 164 may update the second encoder-decoder model 230 based on the one or more losses (e.g., via backpropagation). The ML model training engine 164 may continue training the second encoder-decoder model 230 in this manner and based on a plurality of additional 3P application training instances stored in the given 3P application training instances database 164B until one or more training conditions are satisfied. The one or more training conditions can include, for example, the second encoder-decoder model 230 being trained based on a threshold quantity of 3P application training instances, the second encoder-decoder model 230 being trained for a threshold duration of time, the second encoder-decoder model 230 satisfying one or more performance criteria (e.g., in terms of recall and/or precision), and/or other training criteria.

By training the first encoder-decoder model 220 and the second encoder-decoder model 230 in this manner, the ML model engine 165 of the secure data exchange system 180 may utilize the trained first encoder-decoder model 220 in facilitating secure transfer of data from the automated assistant 115 and to "Example Music Streaming Platform". Further, the ML model engine 165 of the secure data exchange system 180 may utilize the trained second encoder-decoder model 230 in facilitating secure transfer of data from "Example Music Streaming Platform" and to the automated assistant 115. Accordingly, the secure data exchange system 180 enables secure exchange of data between various disparate parties, thereby mitigating a quantity of instances that the data may be compromised and preserving privacy of data associated with users that may be transferred using the secure data exchange system 180.

For instance, again assume that a given user of a given client device previously provided a spoken utterance of "Assistant, play some music using Example Music Streaming Platform". In this example, the automated assistant 115 may cause the ASR engine 120A1 and/or 120A2 to process audio data capturing the spoken utterance to generate ASR output (e.g., recognized text corresponding to the spoken utterance). Further, the automated assistant 115 may cause the NLU engine 130A1 and/or 130A2 to process the ASR output to generate NLU output (e.g., an intent of [intent="play music" ] with corresponding slot values of [platform="Example Streaming Platform" ], [artist="null" ], and/or [song="null" ], where "null" indicates the given user did not provide any slot value for the corresponding artist and song parameters). The automated assistant may utilize the ASR output and/or the NLU output as the user request data 201. Moreover, the automated assistant 115 may obtain the user cohort data 202 and the user profile data 203. In this instance, the user cohort data 202 may include an indication of a given cohort to which the given user is assigned from among a plurality of disparate cohorts, such as a given cohort that indicates the given user is interested in rock music. Further, in this instance, the user profile data 203, may indicate one or more favorite rock artists of the given user.

In this instance, the automated assistant 115 may cause the user request data 201, the user cohort data 202, and/or the user profile data 203 to be transmitted to the independent server as client device data over one or more networks (e.g., the network(s) 199). Further, in response to receiving the client data, the independent server can process the client device data, using the trained first encoder-decoder model 220, to generate the opaque client device data 205. Moreover, the independent server can transmit the opaque client device data 205 to "Example Music Streaming Platform" over one or more networks (e.g., the network(s) 199). In response to receiving the opaque client device data 205, "Example Music Streaming Platform" can process the opaque client data 205, using one or more 3P model(s) 206, to generate the 3P response data 207. In this instance, the one or more 3P model(s) may include, for example, a ranking model that includes a ranking of artists and/or songs that should be played responsive to the spoken utterance and based on processing at least the opaque client device data 205. Further, the opaque client device data 205 can additionally, or alternatively, map the user cohort data 202 to the 3P cohort data 208. Put another way, the user cohort data 202 encoded by the opaque client device data 205 can map the given cohort data to which the user is assigned to a given 3P cohort, from among a plurality of disparate 3P cohorts, which may be dynamically adapted based on the user request data 201 and the user profile data 203 encoded in the opaque client device data 205. For instance, the given user may be assigned to the given cohort represented by the user cohort data 202, but the 3P cohort data 208 that represents the given 3P cohort to which the user is assigned may differ based on changes in the user request data 201 and/or the user profile data 203 that is encoded in the opaque client device data 205. Moreover, the opaque client device data 205 can additionally, or alternatively, map the user profile data 203 managed by the automated assistant 115 to the 3P profile data 209 managed by "Example Music Streaming Platform".

Further, in this instance, "Example Music Streaming Platform" may cause the 3P response data 207, the 3P cohort data 208, and/or the 3P profile data 209 to be transmitted to the independent server as 3P response data over one or more networks (e.g., the network(s) 199). Further, in response to receiving the 3P response data, the independent server can process the 3P response data, using the trained second encoder-decoder model 230, to generate the opaque 3P response data 211. Moreover, the independent server can transmit the opaque 3P response data 211 to the automated assistant 115 executing at least in part at the given client device of the given user and over one or more networks (e.g., the network(s) 199). In response to receiving the opaque 3P response data 211, the automated assistant 115 may determine content 212 to be provided for presentation to the given user via the given client device. In this instance, the content 212 may include a song to be provided for playback in response to receiving the spoken utterance of "Assistant, play some music using Example Music Streaming Platform".

In various implementations, the feedback engine 166 of the secure data exchange system 180 can monitor utilization of the content 212 by the given user to generate a feedback signal for generating additional training instances that may be utilized to update the first encoder-decoder model 220 and/or the second encoder-decoder model 230. For instance, assuming the content 212 includes the song to be provided for playback in response to receiving the spoken utterance of "Assistant, play some music using Example Music Streaming Platform", and assuming that the given user listens to the entire duration of the song, then the feedback engine 166 may utilize this as a positive feedback signal to generate an additional automated assistant application training instance and/or an additional 3P application training instance that positively reinforces the first encoder-decoder model 220 and/or the second encoder-decoder model 230. In contrast, and assuming that the given user only listens to the first 30 second of the song, then the feedback engine 166 may utilize this as a negative feedback signal to generate an additional automated assistant application training instance and/or an additional 3P application training instance that negatively reinforces the first encoder-decoder model 220 and/or the second encoder-decoder model 230.

Although the example of FIG. 2 is described with respect to the automated assistant 115 and a given 3P application (e.g., "Example Music Streaming Platform"), it should be understood that is for the sake of example and is not meant to be limiting. For example, techniques described with respect to FIG. 2 may be employed with respect to the automated assistant 115 and any other 3P application. In these examples, various additional encoder-decoder models may be trained in the same or similar manner, but with respect to other data generated by the various parties and/or utilizing various corresponding sets of tokens. In these examples, the various corresponding sets of tokens may include the same corresponding set of tokens and/or different corresponding sets of tokens. Also, for example, various additional encoder-decoder models may be trained in the same or similar manner, but with respect to disparate 3P applications. In these examples, the independent server may be provided as a service to enable secure transfer of data between the disparate 3P application without any use of the automated assistant 115.

Further, although the example of FIG. 2 is described with respect to training and/or utilizing the first encoder-decoder model 220 and the second encoder-decoder model 230, it should be understood that is for the sake of example and is not meant to be limiting. For example, the same and/or similar techniques may be utilized to train a single encoder-decoder model to facilitate secure transfer of data back and forth between the automated assistant 115 and "Example Music Streaming Platform" since the corresponding set of tokens is commonly agreed upon by both the automated assistant 115 and "Example Music Streaming Platform" and utilized in generating the opaque versions of the data. For instance, the automated assistant application training instances and/or the 3P application training instances may be generated in the same or similar manner described above, but may be utilized to train the single encoder-decoder model that is specific to both the automated assistant application and the 3P application and in lieu of training multiple disparate encoder-decoder that are specific to the respective applications.

Moreover, although the example of FIG. 2 is described with respect to actively utilizing the independent server at inference, that is for the sake of example and is not meant to be limiting. For example, the trained encoder portion 165A1 of the first encoder-decoder model 220 and the trained decoder portion 165A4 may be provided to the automated assistant 115, and the trained decoder portion 165A2 of the first encoder-decoder model 220 and the trained encoder portion 165A3 may be provided to "Example Music Streaming Platform". In this example, intermediated representations of the data may be transmitted between the parties based on the disparate encoder portions and decoder portions of the first encoder-decoder model 220 and the second encoder-decoder model 230 being implemented locally by the disparate parties. Also, for example, the trained first encoder-decoder model 220 and/or the trained second encoder-decoder model 230 may be utilized to generate mappings between data and opaque versions of the data, such that the trained first encoder-decoder model 220 and/or the trained second encoder-decoder model 230 need not be actively utilized at inference.

Figure 3:
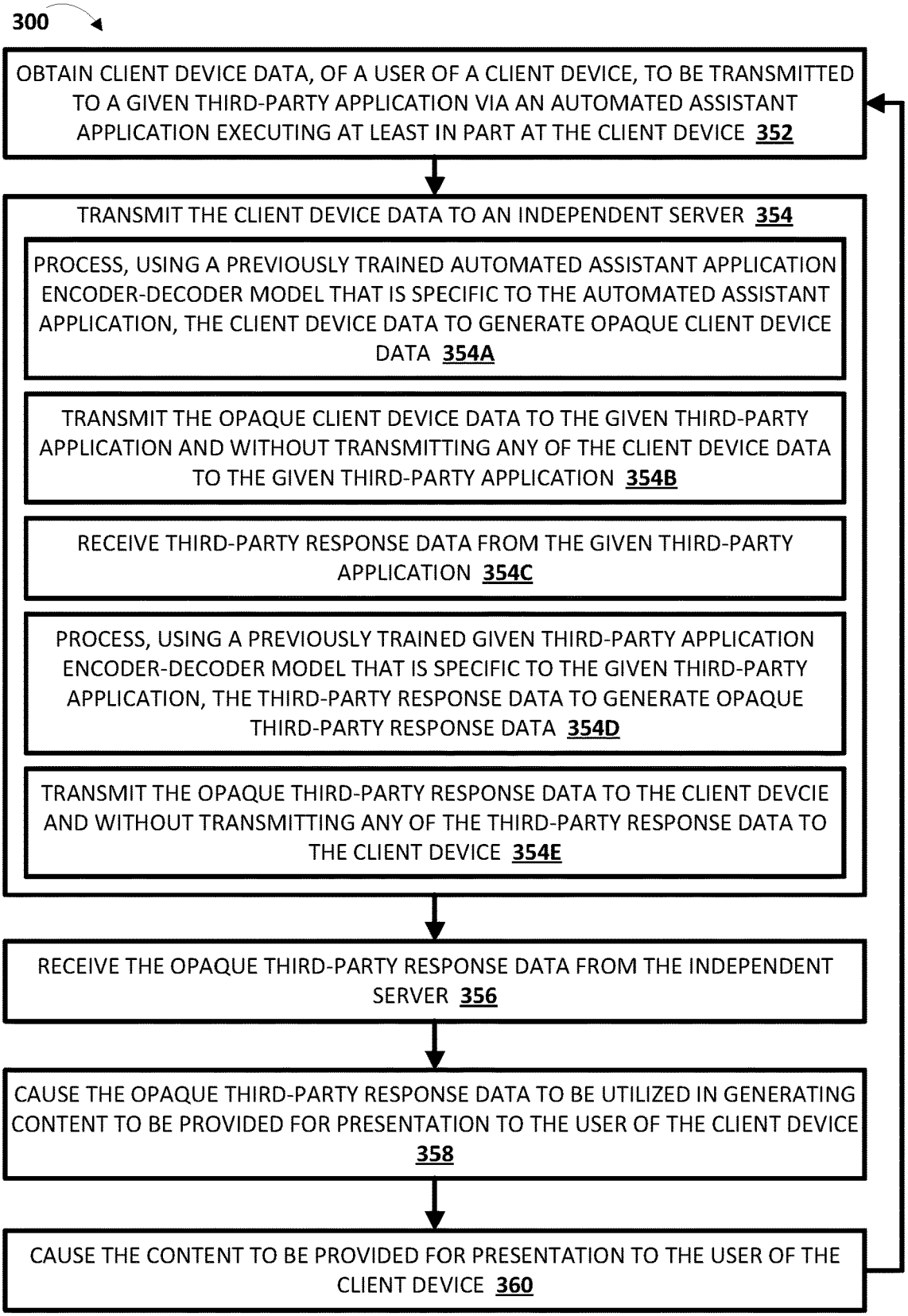
FIG. 3 depicts a flowchart illustrating an example method from the perspective of a client device in facilitating secure exchange of data, in accordance with various implementations.

Turning now to FIG. 3, a flowchart illustrating an example method 300 from the perspective of a client device in facilitating secure exchange of data is depicted. For convenience, the operations of the method 300 are described with reference to a system that performs the operations. This system of the method 300 includes one or more processors, memory, and/or other component(s) of computing device(s) (e.g., client device 110 of FIG. 1, computing device 610 of FIG. 6, and/or other client devices). Moreover, while operations of the method 300 are shown in a particular order, this is not meant to be limiting. One or more operations may be reordered, omitted, and/or added.

At block 352, the system obtains client device data, of a user of a client device, to be transmitted to a given third-party application via an automated assistant application executing at least in part at the client device. The client device data may include, for example, user request data (e.g., based on a spoken utterance or other user input, based on an identified need for a suggestion or recommendation, or the like), user cohort data, and/or user profile data.

At block 354, the system transmits from the client device data to an independent server. The transmitting of the client device data from the client device and to the independent server may cause the independent server to perform various operations, such as those indicated by the operations of blocks 354A-354E. For example, at block 354A, the system causes the independent server to process, using a previously trained automated assistant application encoder-decoder model that is specific to the automated assistant application, the client device data to generate opaque client device data (e.g., trained as described with respect to FIGS. 2 and 5). At block 354B, the system causes the independent server to transmit the opaque client device data to the given third-party application and without transmitting any of the client device data to the given third-party application. At block 354C, the system causes the independent server to receive third-party response data from the given third-party application. Put another way, the independent server transforms the client device data into an opaque version of the client device data (e.g., tokenized version of the client data) that is usable by the given third-party application and without compromising security of the underlying client device data represented by the opaque client device data. The given third-party application uses the opaque client device data, and optionally other given third-party application data (e.g., given third-party application cohort data, given third-party application user profile data), to generate third-party response data that is responsive to the client device data. The given third-party application can transmit the third-party response data back to the independent server.

Figure 5:
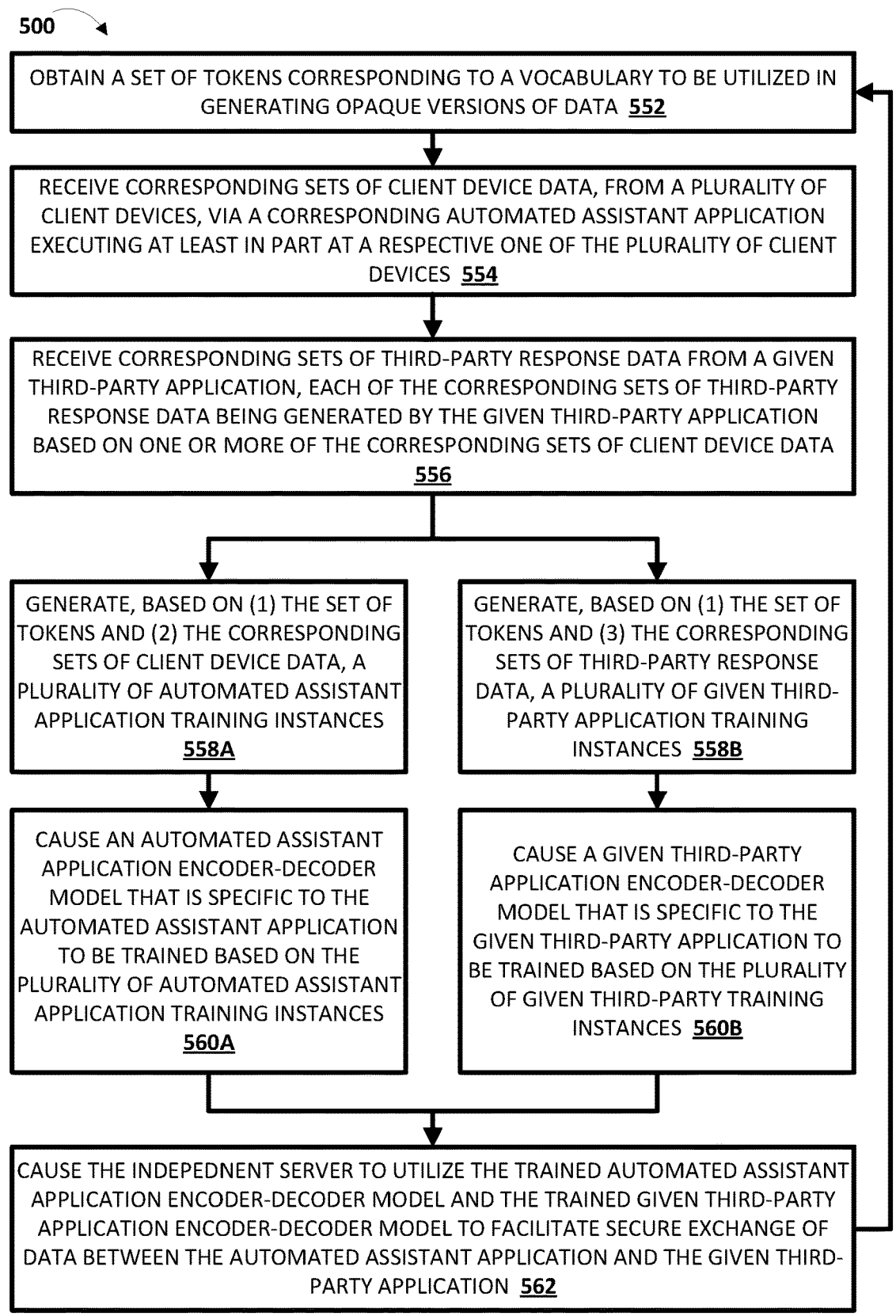
FIG. 5 depicts a flowchart illustrating an example method of training various encoder-decoder models at an independent server and that may be subsequently utilized in facilitating secure exchange of data, in accordance with various implementations.

Further, at block 354C, the system causes the independent server to process, using a previously trained given third-party application encoder-decoder model that is specific to the given third-party application, the third-party response data to generate opaque third-party response data (e.g., trained as described with respect to FIGS. 2 and 5). At block 354E, the system causes the independent server to transmit the opaque third-party response data to the client device and without transmitting any of the third-party response data to the client device. At block 356, the system receives the opaque third-party response data from the independent server. At block 358, the system causes the opaque third-party response data to be utilized in generating content to be provided for presentation to the user of the client device. Put another way, the independent server transforms the third-party response data into an opaque version of the third-party response data (e.g., tokenized version of the third-party response data) that is usable by the automated assistant and without compromising security of the underlying third-party response data represented by the opaque third-party response data. The system causes the automated assistant to utilize the opaque third-party response data to generate content that is to be provided for presentation to the user of the client device. At block 360, the system causes the content to be provided for presentation to the user of the client device. The system can provide the content for visual and/or audible presentation to the user of the client device. The system returns to block 352 to perform an additional iteration of the method 300 of FIG. 3 in response to obtaining additional client device data.

Figure 4:
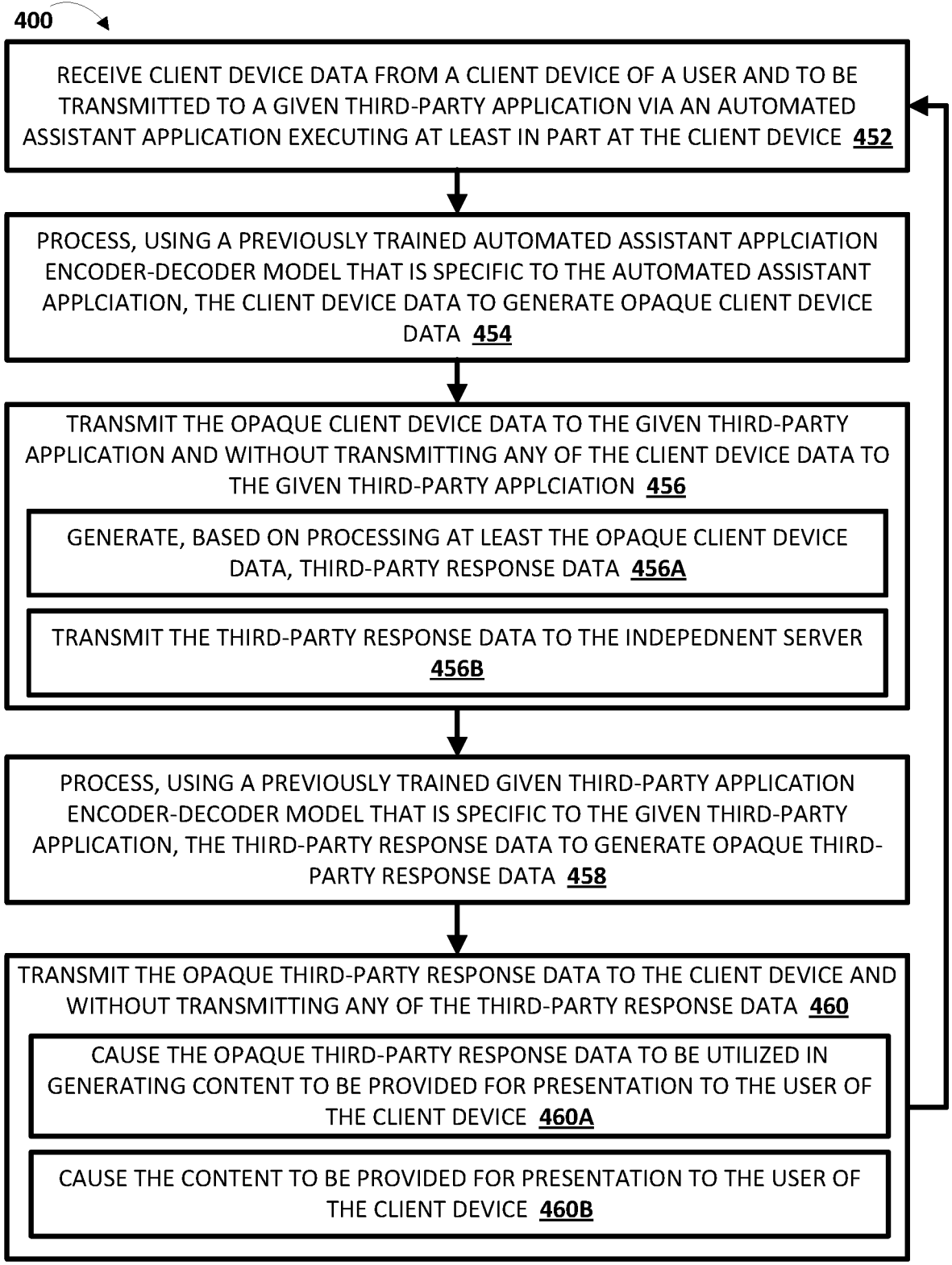
FIG. 4 depicts a flowchart illustrating an example method from the perspective of an independent server in facilitating secure exchange of data, in accordance with various implementations.

Turning now to FIG. 4, a flowchart illustrating an example method 400 from the perspective of an independent server in facilitating secure exchange of data is depicted. For convenience, the operations of the method 400 are described with reference to a system that performs the operations. This system of the method 400 includes one or more processors, memory, and/or other component(s) of computing device(s) (e.g., secure data exchange system 180 of FIG. 1, computing device 610 of FIG. 6, one or more servers, and/or other computing devices). Moreover, while operations of the method 400 are shown in a particular order, this is not meant to be limiting. One or more operations may be reordered, omitted, and/or added.

At block 452, the system receives client device data from a client device of a user and to be transmitted to a given third-party application via an automated assistant application executing at least in part at the client device. At block 454, the system processes, using a previously trained automated assistant application encoder-decoder model that is specific to the automated assistant application, the client device data to generate opaque client device data (e.g., trained as described with respect to FIGS. 2 and 5). At block 456, the system transmits the opaque client device data to the given third-party application and without transmitting any of the client device data to the given third-party application. The transmitting of the opaque client device data from the independent server and to the given third-party application may cause the given third-party application to perform various operations, such as those indicated by the operations of blocks 456A and 456B. For example, at block 456A, the system causes the given third-party application to generate, based on processing at least the opaque client device data, third-party response data. At block 456B, the system causes the given third-party application to transmit the third-party response data to the independent server.

Put another way, the system can transform the client device data into an opaque version of the client device data to increase security of the client device data prior to transmitting the client device data to the given third-party application, such that the given third-party application cannot access or observe the underlying client device data. Although the given third-party application cannot access or observe the underlying client device data, various machine learning models utilized by the given third-party application can nonetheless utilize the opaque client device data to generate third-party response data based on at least the opaque client device data. The given third-party application can then transmit the third-party response data back to the system being implemented by the independent server.

At block 458, the system processes, using a previously trained given third-party application encoder-decoder model that is specific to the given third-party application, the third-party response data to generate opaque third-party response data (e.g., trained as described with respect to FIGS. 2 and 5). At block 460, the system transmits the opaque third-party response data to the client device and without transmitting any of the third-party response data. The transmitting of the opaque third-party response data from the independent server and to the client device may cause the client device to perform various operations, such as those indicated by the operations of blocks 460A and 460B. For example, at block 460A, the system causes the client device to cause the opaque third-party response data to be utilized in generating content to be provided for presentation to the user of the client device. At block 460B, the system causes the content to be provided for presentation to the user of the client device. The system returns to block 452 to perform an additional iteration of the method 400 of FIG. 4 in response to receiving additional client device data.

Put another way, the system can transform the third-party response data into an opaque version of the third-party response data to increase security of the third-party response data prior to transmitting the third-party data to the client device, such that an automated assistant executing at least in part at the client device (and other components of the client device) cannot access or observe the underlying third-party response data. Although the automated assistant (and other components of the client device) cannot access or observe the underlying third-party response data, various machine learning models utilized by the automated assistant (and other components of the client device) can nonetheless utilize the opaque third-party response data to generate content based on at least the opaque third-party response data.

Notably, the client device data and the third-party response data described with respect to the method 300 of FIG. 3 and the method 400 of FIG. 4 may correspond to privacy-sensitive data. In various implementations, non-privacy-sensitive data may be transmitted directly between the system and the given third-party application and without utilizing the independent server. For example, assume that the given third-party application corresponds to "Example Music Streaming Platform" from the example described above with respect to FIG. 2. In this example, music preferences of a given user that is maintained by the system and/or the given third-party application may be considered privacy-sensitive data. Accordingly, in response to determining that the music preferences of the given user correspond to privacy-sensitive data, the system may utilize the independent server to facilitate secure exchange of this data. However, a library of all artists or songs that is maintained by "Example Music Streaming Platform" may be non-privacy-sensitive, and an indication of all the artists or songs may be transmitted directly from "Example Music Streaming Platform" and back to the system without utilization of the independent server.

Turning now to FIG. 5, a flowchart illustrating an example method 500 of training various encoder-decoder models at an independent server and that may be subsequently utilized in facilitating secure exchange of data is depicted. For convenience, the operations of the method 500 are described with reference to a system that performs the operations. This system of the method 500 includes one or more processors, memory, and/or other component(s) of computing device(s) (e.g., secure data exchange system 180 of FIG. 1, computing device 610 of FIG. 6, one or more servers, and/or other computing devices). Moreover, while operations of the method 500 are shown in a particular order, this is not meant to be limiting. One or more operations may be reordered, omitted, and/or added.

At block 552, the system obtains a set of tokens corresponding to a vocabulary to be utilized in generating opaque versions of data. The set of tokens that correspond to the vocabulary may include tokens corresponding to words, phrases, symbols, numbers, and/or any other representation that is capable of encoding underlying meaning of data. The set of tokens may be commonly agreed upon by at least an automated assistant and a given third-party application to facilitate secure transfer of data between the automated assistant and the given third-party application in a bi-directional manner.

At block 554, the system receives corresponding sets of client device data, from a plurality of client devices, via a corresponding automated assistant application executing at least in part at a respective one of the plurality of client devices. At block 556, the system receives corresponding sets of third-party response data from a given third-party application, each of the corresponding sets of third-party response data being generated by the given third-party application based on one or more of the corresponding sets of client device data. The corresponding sets of third-party response data may include data that was previously generated by the given third-party application responsive to processing a respective one of the corresponding sets of client device data. Notably, the system may employ various privacy techniques prior to receiving the corresponding sets of client device data and the corresponding sets of third-party response data to preserve security and/or privacy of the underlying data included in the corresponding sets of client device data and the corresponding sets of third-party response data (e.g., differential privacy, federated learning, or the like).

At block 558A, the system generates, based on (1) the set of tokens and (2) the corresponding sets of client device data, a plurality of automated assistant application training instances. At block 560A, the system causes an automated assistant application encoder-decoder model that is specific to the automated assistant application to be trained based on the plurality of automated assistant application training instances. Generating the plurality of automated assistant application training instances and training the automated assistant application encoder-decoder model is described in more detail herein (e.g., with respect to FIG. 2).

At block 558B, the system generates, based on (1) the set of tokens and (3) the corresponding sets of third-party response data, a plurality of given third-party application training instances. At block 560B, the system causes a given third-party application encoder-decoder model that is specific to the given third-party application to be trained based on the plurality of given third-party training instances. Generating the plurality of third-party application training instances and training the third-party application encoder-decoder model is described in more detail herein (e.g., with respect to FIG. 2).

At block 562, the system causes the independent server to utilize the trained automated assistant application encoder-decoder model and the trained given third-party application encoder-decoder model to facilitate secure exchange of data between the automated assistant application and the given third-party application (e.g., as described with respect to the process flow of FIG. 2, method 300 of FIG. 3, the method 400 of FIG. 4, and/or in any other manner described herein). The system returns to block 552 to perform an additional iteration of the method 500 of FIG. 5.

In some implementations, in performing an additional iteration of the method 500 of FIG. 5, the system may continue training the automated assistant application encoder-decoder model that is specific to the automated assistant application and/or the given third-party application encoder-decoder model that is specific to the given third-party application. The system may continue training these encoder-decoder models until one or more training conditions are satisfied (e.g., as described with respect to FIG. 2). In additional or alternative implementations, in performing an additional iteration of the method 500 of FIG. 5, the system may initiate training of another automated assistant application encoder-decoder model that is specific to the automated assistant application, but for a disparate third-party application and/or an additional given third-party application encoder-decoder model that is specific to an additional given third-party application. In additional or alternative implementations, in performing an additional iteration of the method 500 of FIG. 5, the system may initiate training of other encoder-decoder modes for various disparate third-party applications to enable secure transfer between these disparate third-parties. Put another way, techniques described herein may be utilized to provide secure exchange of data as a service, and the independent server may be a true independent third-party that does not develop and/or maintain any assistant, agent, application, or system that actively utilizes the independent server to facilitate secure exchange of data.

Figure 6:
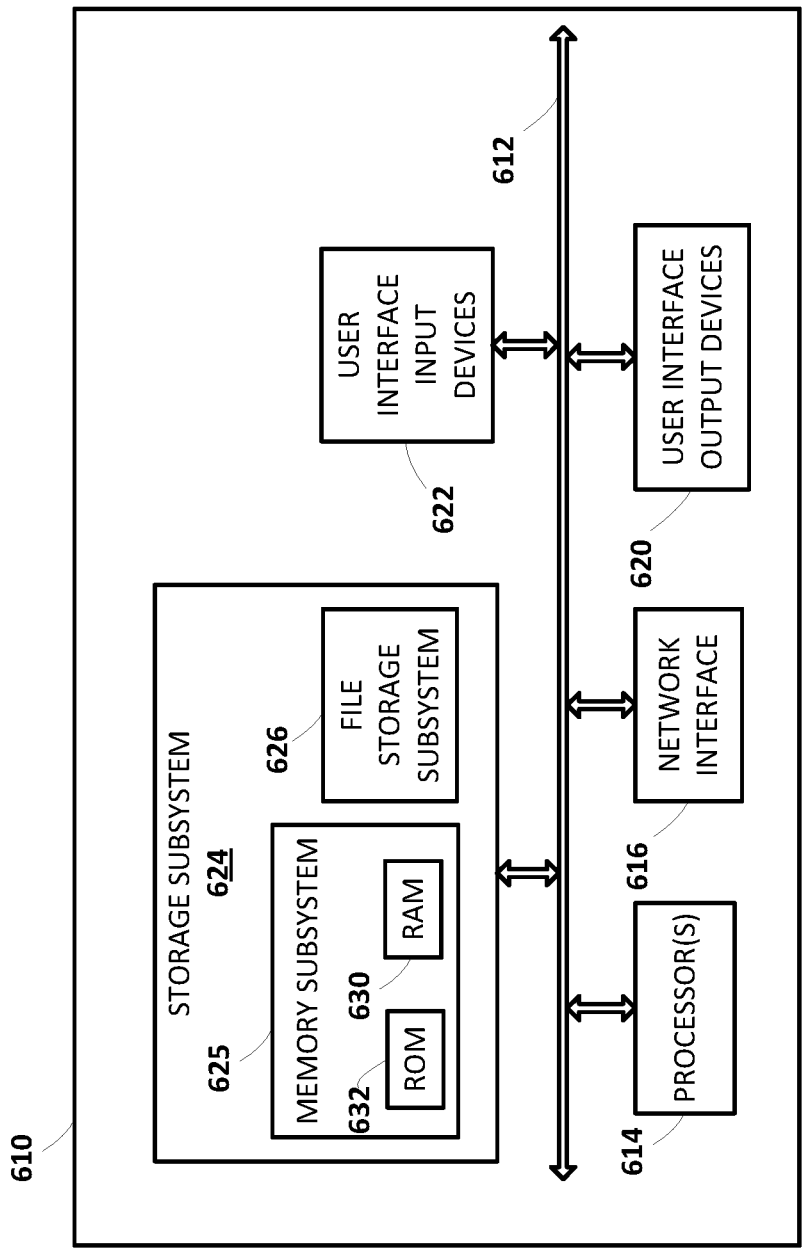
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes obtaining, at a client device of a user, client device data of the user to be transmitted to a given third-party application via an automated assistant application executing at least in part at the client device, and transmitting, from the client device, the client device data to an independent server. Transmitting the client device data to the independent server causes the independent server to: process, using a previously trained automated assistant application encoder-decoder model that is specific to the automated assistant application, the client device data to generate opaque client device data; and transmit the opaque client device data to the given third-party application and without transmitting any of the client device data to the given third-party application. Further, transmitting the opaque client device data to the given third-party application causes the given third-party application to: generate, based on processing at least the opaque client device data, third-party response data; and transmit the third-party response data to the independent server. Moreover, transmitting the response data to the independent server causes the independent server to: process, using a previously trained given third-party application encoder-decoder model that is specific to the given third-party application, the third-party request data to generate opaque third-party response data; and transmit the opaque third-party response data to the client device and without transmitting any of the third-party response data to the client device. The method further includes receiving, at the client device, the opaque third-party response data from the independent server; causing the opaque third-party response data to be utilized in generating content to be provided for presentation to the user of the client device; and causing the content to be provided for presentation to the user of the client device.

These and other implementations of technology disclosed herein can optionally include one or more of the following features.

In some implementations, the method may further include receiving, from the user and via the client device, user input that includes a request directed to an automated assistant application executing at least in part at the client device; and generating, based on processing the user input that includes the request, request data to be transmitted to the independent server to obtain the opaque third-party response data. In some versions of those implementations, the client device data may include the request data.

In some implementations, the method may further include identifying, via an automated assistant application executing at least in part at the client device, a need for a suggestion to be provided for presentation to the user; and generating, based on the need for the suggestion to be provided for presentation to the user, suggestion data to be transmitted to the independent server to obtain the opaque third-party response data. In some versions of those implementations, the client device data may include the suggestion data.

In some implementations, the opaque client device data may include one or more tokens, from a set of tokens corresponding to a vocabulary, that are generated using the previously trained automated assistant application encoder-decoder model.

In some versions of those implementations, generating the third-party response data based on processing at least the opaque client device data may include processing, using a given third-party ranking model, at least the opaque client device data to generate a given third-party ranking as the third-party response data.

In additional or alternative versions of those implementations, generating the third-party response data based on processing at least the opaque client device data may include processing, using a given third-party suggestion model, at least the opaque client device data to generate a given third-party suggestion as the third-party response data.

In additional or alternative versions of those implementations, the opaque third-party response data may include one or more additional tokens, from the set of tokens corresponding to the vocabulary, that are generated using the previously trained given third-party application encoder-decoder model.

In some implementations, the client device data may be privacy-sensitive data and transmitting the client device data from the client device and to the independent server may be in response to determining that the client device data is privacy-sensitive data. In some versions of those implementations, the method may further include transmitting, from the client device, additional client device data that is non-privacy-sensitive directly to the given third-party application without transmitting the additional client device data to the independent server. In some additional or alternative versions of those implementations, the method may further include receiving, at the client device, additional third-party response data that is non-privacy-sensitive directly from the given third-party application.

In some implementations, the method may further include generating, based on user input received responsive to causing the content to be provided for presentation to the user of the client device, a feedback signal to be utilized in updating the previously trained automated assistant application encoder-decoder model and/or the previously trained given third-party application encoder-decoder model; and transmitting, from the client device, the feedback signal to the independent server. In some versions of those implementations, transmitting the feedback signal to the independent server may further cause the independent server to: update, based on the feedback signal, the previously trained automated assistant application encoder-decoder model and/or the previously trained given third-party application encoder-decoder model.

In some implementations, the previously trained automated assistant application encoder-decoder model may be specific to the automated assistant application for the given third-party application to facilitate secure exchange of data between the automated assistant application and the given third-party application, and the previously trained given third-party application encoder-decoder model may be specific to the given third-party application for the automated assistant application to facilitate the secure exchange of data between the automated assistant application and the given third-party application.

In some implementations, a method implemented by one or more processors is provided, and includes receiving, at an independent server, client device data from a client device of a user and to be transmitted to a given third-party application via an automated assistant application executing at least in part at the client device; processing, using a previously trained automated assistant application encoder-decoder model that is specific to the automated assistant application, the client device data to generate opaque client device data; and transmitting, from the independent server, the opaque client device data to the given third-party application and without transmitting any of the client device data to the given third-party application. Transmitting the opaque client device data to the given third-party application causes the given third-party application to: generate, based on processing at least the opaque client device data, third-party response data; and transmit the third-party response data to the independent server. The method further includes processing, using a previously trained given third-party application encoder-decoder model that is specific to the given third-party application, the third-party response data to generate opaque third-party response data; and transmitting, from the independent server, the opaque third-party response data to the client device and without transmitting the third-party response data to the client device. Transmitting the opaque third-party response data to the client device causes the client device to: cause the opaque third-party response data to be utilized in generating content to be provided for presentation to the user of the client device; and cause the content to be provided for presentation to the user of the client device.

These and other implementations of technology disclosed herein can optionally include one or more of the following features.

In some implementations, the method may further include receiving, at the independent server, additional client device data from the client device of the user and to be transmitted to an additional given third-party application via the automated assistant application executing at least in part at the client device; processing, using an additional previously trained automated assistant application encoder-decoder model that is specific to the automated assistant application, the additional client device data to generate additional opaque client device data; and transmitting, from the independent server, the additional opaque client device data to the additional given third-party application and without transmitting any of the additional client device data to the additional given third-party application. Transmitting the additional opaque client device data to the additional given third-party application causes the additional given third-party application to: generate, based on processing at least the additional opaque client device data, additional third-party response data; and transmit the additional third-party response data to the independent server. The method may further include processing, using an additional previously trained additional given third-party application encoder-decoder model that is specific to the additional given third-party application, the additional third-party response data to generate additional opaque third-party response data; and transmitting, from the independent server, the additional opaque third-party response data to the client device and without transmitting the additional third-party response data to the client device. Transmitting the additional opaque third-party response data to the client device causes the client device to: cause the additional opaque third-party response data to be utilized in generating additional content to be provided for presentation to the user of the client device; and cause the additional content to be provided for presentation to the user of the client device.

In some versions of those implementations, the previously trained automated assistant application encoder-decoder model may be specific to the automated assistant application for the given third-party application to facilitate secure exchange of data between the automated assistant application and the given third-party application, the previously trained additional automated assistant application encoder-decoder model may be specific to the automated assistant application for the additional given third-party application to facilitate the secure exchange of data between the automated assistant application and the additional given third-party application, and the previously trained additional automated assistant application encoder-decoder model may be distinct from the previously trained automated assistant application encoder-decoder model.

In some further versions of those implementations, the previously trained given third-party application encoder-decoder model may be specific to the given third-party application for the automated assistant application to facilitate the secure exchange of data between the automated assistant application and the given third-party application, the previously trained additional given third-party application encoder-decoder model may be specific to the additional given third-party application for the automated assistant application to facilitate the secure exchange of data between the automated assistant application and the additional given third-party application, and the previously trained given third-party application encoder-decoder model may be distinct from the previously trained additional given third-party application encoder-decoder model.

In some implementations, a method implemented by one or more processors is provided, and includes obtaining, at an independent server, a set of tokens corresponding to a vocabulary to be utilized in generating opaque versions of data; receiving, at the independent server, corresponding sets of client device data from a plurality of client devices via a corresponding automated assistant application executing at least in part at a respective one of the plurality of client devices; receiving, at the independent server, corresponding sets of response data from a given third-party application, each of the corresponding sets of response data being generated by the given third-party application based on one or more of the corresponding sets of client device data; generating, based on (i) the set of tokens and (ii) the corresponding sets of client device data, a plurality of automated assistant application training instances; causing an automated assistant application encoder-decoder model that is specific to the automated assistant application to be trained based on the plurality of automated assistant application training instances; generating, based on (i) the set of tokens and (iii) the corresponding sets of response data, a plurality of third-party application training instances; causing a given third-party application encoder-decoder model that is specific to the given third-party application to be trained based on the plurality of given third-party application training instances; and subsequent to causing the automated assistant application encoder-decoder model to be trained based on the plurality of automated assistant application training instances, and subsequent to causing the given third-party application encoder-decoder model to be trained based on the plurality of given third-party application training instances: causing the independent server to utilize the trained automated assistant application encoder-decoder model and the trained given third-party application encoder-decoder model in facilitating secure exchange of data between the corresponding automated assistant applications executing at least in part at the plurality of client devices and the given third-party application.

These and other implementations of technology disclosed herein can optionally include one or more of the following features.

In some implementations, generating a given automated assistant application training instance, of the plurality of automated assistant application training instances, may include identifying given client device data, from the corresponding sets of client device data, to be utilized as training instance input for the given automated assistant application training instance; and identifying one or more tokens, from the set of tokens, to be utilized as training instance output for the given automated assistant application training instance.

In some versions of those implementations, generating a given third-party application training instance, of the plurality of third-party application training instances, may include identifying given response data, from the corresponding sets of response data, to be utilized as training instance input for the given third-party application training instance; and identifying one or more additional tokens, from the set of tokens, to be utilized as training instance output for the given third-party application training instance.

In some implementations, the method may further include causing a differential privacy technique to be utilized by the plurality of client devices to cause the corresponding sets of client device data to be transmitted to the independent server in a privacy-sensitive manner; and causing the differential privacy technique to be utilized by the given third-party application to cause the corresponding sets of response data to be transmitted to the independent server in the privacy-sensitive manner.

In some implementations, the method may further include causing a federated learning technique to be utilized by the plurality of client devices to cause the corresponding sets of client device data to be transmitted to the independent server in a privacy-sensitive manner; and causing the federated learning technique to be utilized by the given third-party application to cause the corresponding sets of response data to be transmitted to the independent server in the privacy-sensitive manner.

In some implementations, a method implemented by one or more processors is provided, and includes obtaining, at a client device of a user, client device data of the user to be transmitted to a given third-party application via an automated assistant application executing at least in part at the client device, and transmitting, from the client device, the client device data to an independent server. Transmitting the client device data to the independent server causes the independent server to: process, using a previously trained encoder-decoder model that is specific to both the automated assistant application and the given third-party application, the client device data to generate opaque client device data; and transmit the opaque client device data to the given third-party application and without transmitting any of the client device data to the given third-party application. Further, transmitting the opaque client device data to the given third-party application causes the given third-party application to: generate, based on processing at least the opaque client device data, third-party response data; and transmit the third-party response data to the independent server. Moreover, transmitting the response data to the independent server causes the independent server to: process, using the previously trained encoder-decoder model that is specific to both the automated assistant application and the given third-party application, the third-party request data to generate opaque third-party response data; and transmit the opaque third-party response data to the client device and without transmitting any of the third-party response data to the client device. The method further includes receiving, at the client device, the opaque third-party response data from the independent server; causing the opaque third-party response data to be utilized in generating content to be provided for presentation to the user of the client device; and causing the content to be provided for presentation to the user of the client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

obtaining, at a client device of a user, client device data of the user to be transmitted to a given third-party application via an automated assistant application executing at least in part at the client device;

transmitting, from the client device, the client device data to an independent server, wherein transmitting the client device data to the independent server causes the independent server to:

process, using a previously trained automated assistant application encoder-decoder model that is specific to the automated assistant application, the client device data to generate opaque client device data, the opaque client device data including a plurality of tokens that represent the client device data but are not semantically interpretable by a human reviewer upon inspection; and transmit the opaque client device data to the given third-party application and without transmitting any of the client device data to the given third-party application;

wherein transmitting the opaque client device data to the given third-party application causes the given third-party application to:

generate, based on processing at least the opaque client device data, third-party response data; and transmit the third-party response data to the independent server; and wherein transmitting the response data to the independent server causes the independent server to:

process, using a previously trained given third-party application encoder-decoder model that is specific to the given third-party application, the third-party request data to generate opaque third-party response data, the opaque third-party response data including a plurality of additional tokens that represent the third-party response data but are not semantically interpretable by the human reviewer upon inspection; and transmit the opaque third-party response data to the client device and without transmitting any of the third-party response data to the client device;

receiving, at the client device, the opaque third-party response data from the independent server;

causing the opaque third-party response data to be utilized in generating content to be provided for presentation to the user of the client device; and causing the content to be provided for presentation to the user of the client device.

2. The method of claim 1, further comprising:

receiving, from the user and via the client device, user input that includes a request directed to an automated assistant application executing at least in part at the client device; and generating, based on processing the user input that includes the request, request data to be transmitted to the independent server to obtain the opaque third-party response data.

3. The method of claim 2, wherein the client device data comprises the request data.

4. The method of claim 1, further comprising:

identifying, via an automated assistant application executing at least in part at the client device, a need for a suggestion to be provided for presentation to the user; and generating, based on the need for the suggestion to be provided for presentation to the user, suggestion data to be transmitted to the independent server to obtain the opaque third-party response data.

5. The method of claim 4, wherein the client device data comprises the suggestion data.

6. The method of claim 1, wherein the plurality of tokens that represent the client device data are from a set of tokens corresponding to a vocabulary and are generated using the previously trained automated assistant application encoder-decoder model.

7. The method of claim 6, wherein generating the third-party response data based on processing at least the opaque client device data comprises:

processing, using a given third-party ranking model, at least the opaque client device data to generate a given third-party ranking as the third-party response data.

8. The method of claim 6, wherein generating the third-party response data based on processing at least the opaque client device data comprises:

processing, using a given third-party suggestion model, at least the opaque client device data to generate a given third-party suggestion as the third-party response data.

9. The method of claim 6, wherein the plurality of additional tokens that represent the third-party response data are from the set of tokens corresponding to the vocabulary and are generated using the previously trained given third-party application encoder-decoder model.

10. The method of claim 1, wherein the client device data is privacy-sensitive data, and wherein transmitting the client device data from the client device and to the independent server is in response to determining that the client device data is privacy-sensitive data.

11. The method of claim 10, further comprising:

transmitting, from the client device, additional client device data that is non-privacy-sensitive directly to the given third-party application without transmitting the additional client device data to the independent server.

12. The method of claim 11, further comprising:

receiving, at the client device, additional third-party response data that is non-privacy-sensitive directly from the given third-party application.

13. The method of claim 1, further comprising:

generating, based on user input received responsive to causing the content to be provided for presentation to the user of the client device, a feedback signal to be utilized in updating the previously trained automated assistant application encoder-decoder model and/or the previously trained given third-party application encoder-decoder model; and transmitting, from the client device, the feedback signal to the independent server.

14. The method of claim 13, wherein transmitting the feedback signal to the independent server further causes the independent server to:

update, based on the feedback signal, the previously trained automated assistant application encoder-decoder model and/or the previously trained given third-party application encoder-decoder model.

15. The method of claim 1, wherein the previously trained automated assistant application encoder-decoder model is specific to the automated assistant application for the given third-party application to facilitate secure exchange of data between the automated assistant application and the given third-party application, and wherein the previously trained given third-party application encoder-decoder model is specific to the given third-party application for the automated assistant application to facilitate the secure exchange of data between the automated assistant application and the given third-party application.

16. A method implemented by one or more processors, the method comprising:

receiving, at an independent server, client device data from a client device of a user and to be transmitted to a given third-party application via an automated assistant application executing at least in part at the client device;

processing, using a previously trained automated assistant application encoder-decoder model that is specific to the automated assistant application, the client device data to generate opaque client device data, the opaque client device data including a plurality of tokens that represent the client device data but are not semantically interpretable by a human reviewer upon inspection;

transmitting, from the independent server, the opaque client device data to the given third-party application and without transmitting any of the client device data to the given third-party application,
  wherein transmitting the opaque client device data to the given third-party application causes the given third-party application to:
    generate, based on processing at least the opaque client device data, third-party response data; and
    transmit the third-party response data to the independent server;
processing, using a previously trained given third-party application encoder-decoder model that is specific to the given third-party application, the third-party response data to generate opaque third-party response data, the opaque third-party response data including a plurality of additional tokens that represent the third-party response data but are not semantically interpretable by the human reviewer upon inspection; and
transmitting, from the independent server, the opaque third-party response data to the client device and without transmitting the third-party response data to the client device,
  wherein transmitting the opaque third-party response data to the client device causes the client device to:
    cause the opaque third-party response data to be utilized in generating content to be provided for presentation to the user of the client device; and
    cause the content to be provided for presentation to the user of the client device.

17. A method implemented by one or more processors, the method comprising:
  obtaining, at an independent server, a set of tokens corresponding to a vocabulary to be utilized in generating opaque versions of data;
  receiving, at the independent server, corresponding sets of client device data from a plurality of client devices via a corresponding automated assistant application executing at least in part at a respective one of the plurality of client devices;
  receiving, at the independent server, corresponding sets of response data from a given third-party application, each of the corresponding sets of response data being generated by the given third-party application based on one or more of the corresponding sets of client device data;
  generating, based on (i) the set of tokens and (ii) the corresponding sets of client device data, a plurality of automated assistant application training instances;
  causing an automated assistant application encoder-decoder model that is specific to the automated assistant application to be trained based on the plurality of automated assistant application training instances;
  generating, based on (i) the set of tokens and (iii) the corresponding sets of response data, a plurality of third-party application training instances;
  causing a given third-party application encoder-decoder model that is specific to the given third-party application to be trained based on the plurality of given third-party application training instances; and
  subsequent to causing the automated assistant application encoder-decoder model to be trained based on the plurality of automated assistant application training instances, and subsequent to causing the given third-party application encoder-decoder model to be trained based on the plurality of given third-party application training instances:
    causing the independent server to utilize the trained automated assistant application encoder-decoder model and the trained given third-party application encoder-decoder model in facilitating secure exchange of data between the corresponding automated assistant applications executing at least in part at the plurality of client devices and the given third-party application.

18. The method of claim 17, wherein generating a given automated assistant application training instance, of the plurality of automated assistant application training instances, comprises:
  identifying given client device data, from the corresponding sets of client device data, to be utilized as training instance input for the given automated assistant application training instance; and
  identifying one or more tokens, from the set of tokens, to be utilized as training instance output for the given automated assistant application training instance.

19. The method of claim 18, wherein generating a given third-party application training instance, of the plurality of third-party application training instances, comprises:
  identifying given response data, from the corresponding sets of response data, to be utilized as training instance input for the given third-party application training instance; and
  identifying one or more additional tokens, from the set of tokens, to be utilized as training instance output for the given third-party application training instance.

20. The method of claim 17, further comprising:
  causing a differential privacy technique or a federated learning technique to be utilized by the plurality of client devices to cause the corresponding sets of client device data to be transmitted to the independent server in a privacy-sensitive manner; and
  causing the differential privacy technique or the federated learning technique to be utilized by the given third-party application to cause the corresponding sets of response data to be transmitted to the independent server in the privacy-sensitive manner.

* * * * *